United States Patent [19]

Kardoes et al.

[11] Patent Number: 4,836,687
[45] Date of Patent: Jun. 6, 1989

[54] WASTE PIT STIRRER

[75] Inventors: Oliver A. Kardoes, R.R. 1, Box 63, Titonka, Iowa 50480; Richard T. Kardoes, Wesley, Iowa; David A. Bonestroo, Lake Elmo, Minn.

[73] Assignee: Oliver A. Kardoes, Titonka, Iowa

[21] Appl. No.: 852,632

[22] Filed: Apr. 16, 1986

[51] Int. Cl.$^4$ .............................................. B01F 7/06
[52] U.S. Cl. ..................................... 366/286; 366/308
[58] Field of Search ............... 366/261, 270, 308, 326, 366/330, 285, 286, 279; 416/142 R, 237, DIG. 3, 235, 236 R, 236 A; 180/53.3, 53.1

[56] References Cited

U.S. PATENT DOCUMENTS

| | | | |
|---|---|---|---|
| 1,041,913 | 10/1912 | Tyson | 416/236 A |
| 2,104,306 | 1/1938 | McLeod | 416/236 A |
| 2,581,535 | 1/1952 | Jackson | 180/53.3 X |
| 3,111,954 | 11/1963 | Duncan | 134/169 |
| 3,166,303 | 1/1965 | Chapman | 416/237 X |
| 3,168,255 | 2/1965 | Bellows | 241/46 |
| 3,223,389 | 12/1965 | Simmonds | 416/142 |
| 3,367,583 | 2/1968 | Kellogg | 366/270 X |
| 3,559,962 | 2/1971 | Enssle | 259/111 |
| 3,656,974 | 4/1972 | Mihalyi | 99/348 |
| 3,905,725 | 9/1975 | Johnson | 366/136 X |
| 3,975,469 | 8/1976 | Fuchs | 261/87 |
| 4,054,272 | 10/1977 | Cooke | 366/330 X |
| 4,172,691 | 10/1979 | Comstock et al. | 416/DIG. 3 X |
| 4,329,069 | 5/1982 | Graham | 366/270 |

FOREIGN PATENT DOCUMENTS

| | | | |
|---|---|---|---|
| 306599 | 3/1933 | Italy | 366/286 |
| 1048964 | 11/1966 | United Kingdom | 366/285 |
| 1213501 | 11/1970 | United Kingdom | 366/286 |

Primary Examiner—Harvey C. Hornsby
Assistant Examiner—Scott Haugland
Attorney, Agent, or Firm—Anthony G. Eggink

[57] ABSTRACT

An adjustable stirring device for agitating non-homogeneous waste materials in structures having ingress/egress ports of a predetermined size. The device has a collapsible agitator assembly with a size greater than that of the ingress/egress port when in its expanded and operative state. The agitator assembly has a hub and at least one pivotally attached blade, which is constructed and arranged so that the blade is collapsible for insertion and removal from the ingress/egress port. The agitator assembly and its blades are of a certain configuration for use in municipal and agricultural waste structures. The device is further provided with an adjustable drive shaft assembly connected to the agitator assembly. A frame structure is provided for supporting the drive member assembly and for aligning the agitator assembly in an operative position. Alignment means are mounted to the frame structure, which is constructed and arranged to tilt the drive member with respect to the frame and to slide the drive shaft member into and from the waste structure ports.

20 Claims, 4 Drawing Sheets

WASTE PIT STIRRER

BACKGROUND OF THE INVENTION

This invention relates to agitation devices for agitating non-homogeneous waste material in agricultural and municipal waste enclosures having limited access. Particularly, this invention relates to stirring solid and liquid components of agricultural manure into a slurry state in large waste structure having access ports of the predetermined size.

A problem has long existed in the agitation of agricultural and municipal waste materials. Generally, the waste materials are contained in large enclosures having relatively small openings or ports for the removal of the waste materials. These small entry ports also make it difficult to permit the introduction of stirring devices of sufficient size to bring the solid and liquid components to a slurry state so that they can be more easily emptied or pumped.

In the past, various systems have been used or proposed to agitate waste components in large structures. However, these systems have generally been limited to devices installed as permanent fixtures and to devices having agitators no larger than the diameter of the access port. These devices have generally been either inefficient and ineffective in agitating solid and liquid components to a slurry state or too costly to build and maintain.

Additionally, collapsible stirring devices have been proposed for other specific uses, such as the agitation of paint or similar relatively non-viscous materials. These stirring devices due to their specific uses, have agitator configurations which inherently are unsuited for the agitation and stirring of the non-homogeneous waste materials in municipal and agricultural settings.

The waste pit stirrer of this invention overcomes the limitations and shortcomings of these prior art devices. And, the stirrer device of this invention fullfils a long-standing agricultural need for the effective agitation of lumpy or physically separate solid and liquid waste materials in waste structures, such as manure pits. Accordingly, the device of the present invention is a portable, adjustable and collapsible stirrer that can be inserted into a waste enclosure having an access port of a predetermined size to agitate its contents. The stirrer device of this invention provides a means of introducing a large stirring or agitating assembly through a small opening port by collapsing or folding the assembly.

SUMMARY OF THE INVENTION

The present invention provides a portable, adjustable, and collapsible stirring device for agitation of non-homogeneous municipal and agricultural waste products to a slurry state contained in structure having ingress/egress ports of a predetermined diameter. The device comprises a frame structure, a positioning sleeve, a first linear force means, a drive shaft assembly, a second linear force means and an agitator assembly.

The frame structure is rigid and is for supporting the other elements of the device and for aligning the device in an operative position. The positioning sleeve is hollow and pivotally connected to the frame structure so that it will rotate out of the horizontal plane of the frame structure. The angle of incline between the positioning sleeve and frame structure is generally variable between 1 to 50 degrees. The first linear force means adjustably and movably connects the frame structure and the positioning sleeve and is for aligning the positioning sleeve relative to the horizontal plane or angle of the access port.

The drive shaft assembly is elongated and extends through the hollow interior of the positioning sleeve and out both open ends thereof. Its extention through the positioning sleeve is movable. The drive shaft assembly is connectible at one end to the power source. The rotational force from the power source is translated by the shaft to the agitator assembly attached to its opposite end, which in its collapsed configurations is insertable into the waste structure.

The second linear force means is connected to the positioning sleeve and the drive shaft assembly. It functions as a means for adjusting the position of the drive shaft assembly in and through the positioning sleeve, so that the drive shaft assembly may be inserted and removed from the waste structure via the access port.

The agitator assembly is connected to the insertable end of the drive shaft assembly. It has a plurality of radially extending blades which are pivotally attached to a hub which is mounted to the drive shaft assembly. The agitator assembly is collapsible for insertion into and removal from the access port and it is expansible to a larger operative diameter upon rotation once inside the waste structure. The agitator assembly stirs the waste structure contents to a slurry state so that it can be removed by conventional pumping means for agricultural or municipal purposes.

The device may be used where other stirring devices cannot due to their inflexibility. The device is portable. It may be mounted to a tractor or on a trailer. The device may be powered by an electric motor, internal combustion engine, hydraulic motor or power take-off of a tractor. The drive shaft assembly and agitator assembly are aligned with varying angle access ports by tilting them via the positioning sleeve which is pivotally mounted on the frame structure and whose angle is adjustable by means of the first linear force means. This means may be either mechanical or hydraulic. The device is used in varying depth structures by raising and lowering the drive shaft assembly through the positioning sleeve by means of the second linear force means. This means may be either mechanical or hydraulic. To provide for great variances in depth, various length drive shaft assemblies may be used.

The agitator assembly is provided in several entry and removal diameters to allow entry into various size ports, i.e., 6 to 24 inches in diameter. The agitator assembly blades, therefore, also vary in length and in width for various ports of entry. The agitator or propellor assembly has particular configurations with respect to the way it hinges and stops in place.

These and other benefits of the invention will become clear from the following description, by reference to the drawings.

DESCRIPTION OF THE PREFERRED EMBODIMENTS

Figure 1:
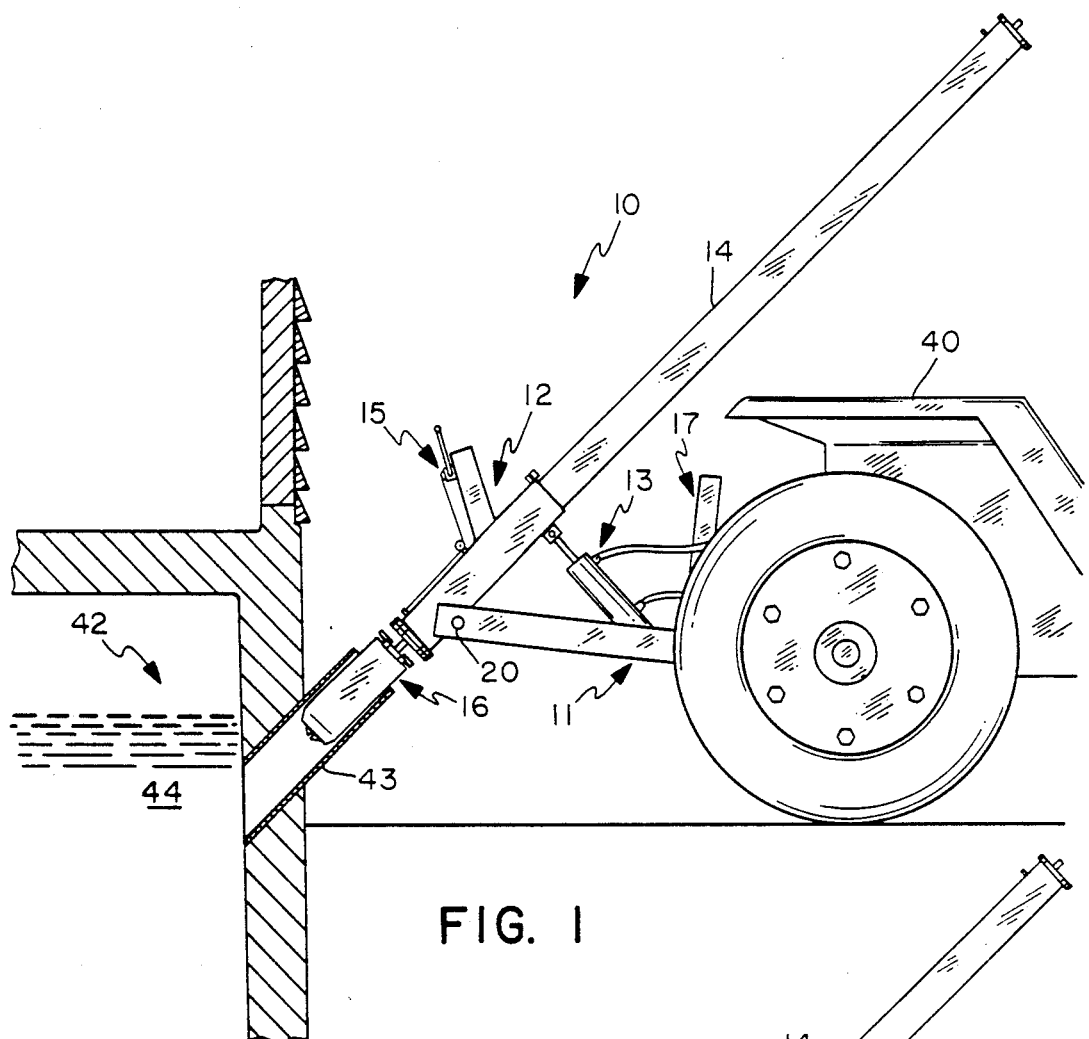
FIG. 1 shows the waste pit stirrer device of this invention mounted to a tractor and in a position for insertion into the access port of the waste structure.

FIG. 1 shows the waste pit stirrer 10 comprising a frame assembly 11, a positioning sleeve 12, a first linear force means 13, a drive shaft assembly 14, a second linear force means 15, and an agitator assembly 16. The device 10 is portable, adjustable and collapsible. The device 10, as shown, is mounted to a tractor 40; however, the device can also be mounted on a trailer 51, as is shown in FIG. 2.

Figure 2:
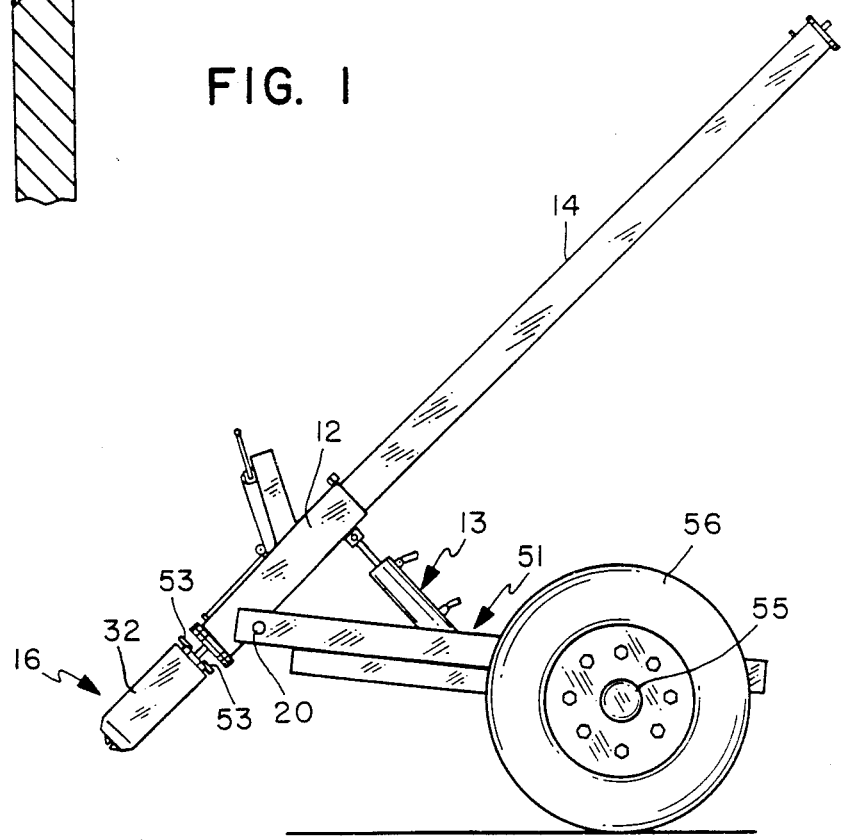
FIG. 2 shows an alternative embodiment of the waste pit stirrer device mounted on a trailer.

FIG. 2 shows the pit stirrer mounted to a trailer 51 having an axel 55 and wheels 56. The remainder of the device structure is similar to that shown in FIG. 1, except for the 3 point hitch attachment. The agitator assembly 16 is shown to have three blades 32 which are in a triangular collapsed position.

Figure 3:
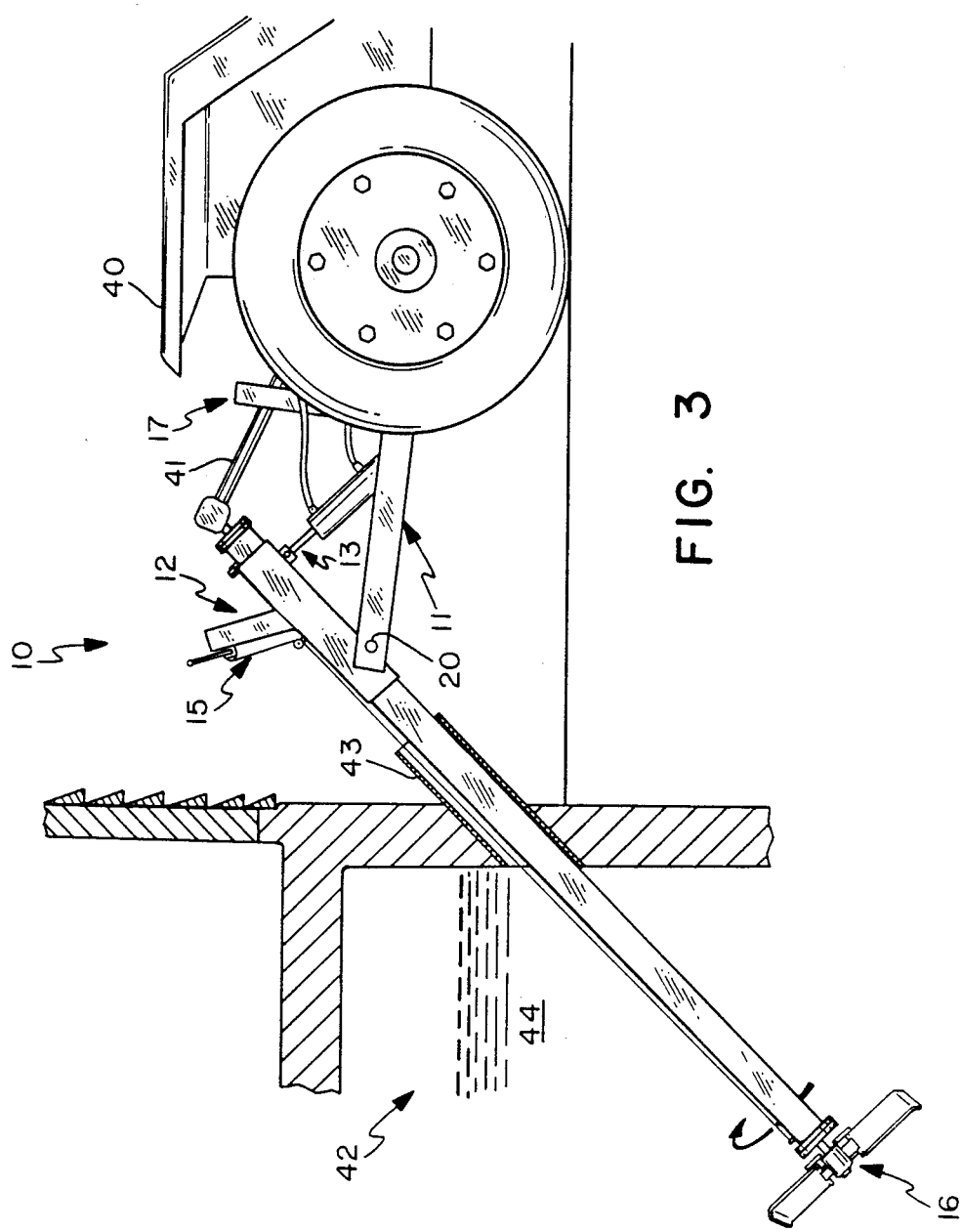
FIG. 3 shows the device of FIG. 1 in an operative position in a waste structure and being connected to the power take-off of a tractor.

Referring to FIGS. 1 and 3, the device 10 is insertable into a waste structure 42 such as a hog manure pit via its access port 43. It provides a means to agitate into a slurry state the non-homogeneous solid and liquid components of waste 44 contained in the waste structure or enclosure 42. The slurry is then drained or pumped from the pit 42. The slurry is then drained or pumped from the pit 42 by conventional means for a variety of agricultural or municipal purposes, such as fertilization. The device 10 is particularly useful for such purposes in large structures 42 having relatively small ports 43, for example, diameters of 6 to 24 inches.

As is shown in FIG. 3, the device 10 is connectable to the power take-off 41 of a tractor 40. The device 10 may also be used in conjunction with other power sources such as electric motors, internal combustion engines or hydraulic drive systems.

FIGS. 1 and 3 further show the device 10 having a 3 point cariage arrangement, powered by power take-off 41 of a tractor 40, which is tilted by means of a hydraulic cylinder 13 and raised and lowered manually by means of a winch assembly 15. The device 10 is used by mounting the frame assembly 11 to the 3 point hitch on a tractor 40. The device 10 is backed up to the access port 43 of the waste structure 42, and the drive shaft assembly 14 is then aligned with the port 43. The agitator assembly 16 is then brought above the top of the port 43. By means of the hydraulic cylinder 13, the drive shaft 14 is aligned with the angle or horizontal plane of the access port 43. The collapsed agitator assembly 16 is then lowered into the structure using the winch assembly 15. The drive shaft assembly 14 is locked down so it cannot raise by itself from the trust of the agitator assembly 16. The power take-off 41 is next attached to the drive shaft assembly 14. The power take-off 41 is engaged slowly so as to allow the agitator assembly 16 to unfold or expand to an operative position. It is brought up to operative speed and used until agitation is complete. When agitation is complete, the device is removed from the waste enclosure 42 by collapsing the blades of the agitator assembly 16.

Figure 4:
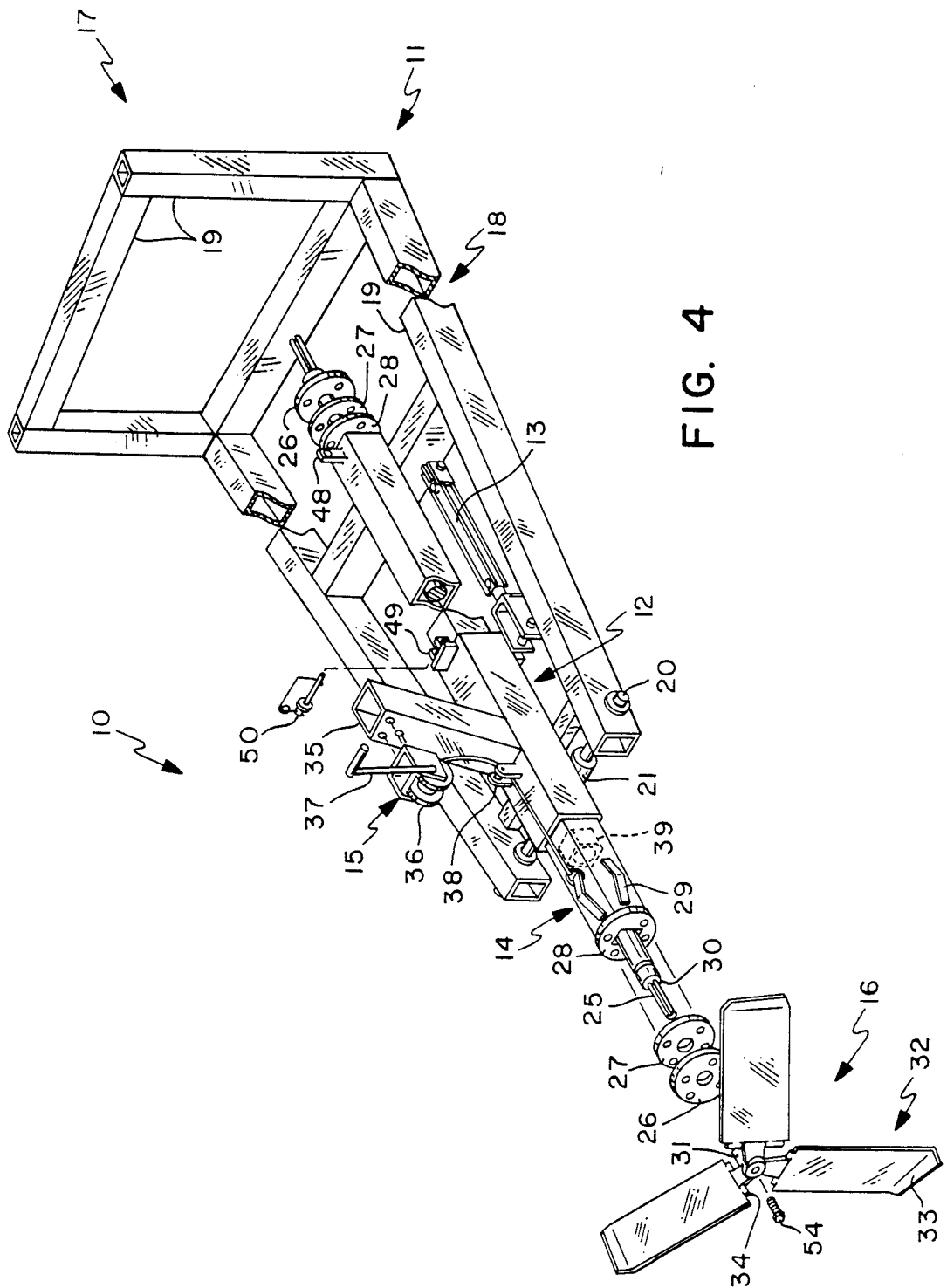
FIG. 4 is a perspective view of the waste stirrer device of the present invention and which shows the various elements of the device.

Referring to FIG. 4, the frame assembly 11 is comprised of an upright carriage member 17 and a substantially horizontal support member 18. The carriage member 17 is generally rectangular and is constructed of three or four rigid metal beams 19. The carriage member 17 is for mounting the frame assembly 11 to a tractor. The carriage 17 has three 3-point mounting brackets 47 disposed so that they are attachable to the 3-point hitch of a tractor. One such bracket 47 is fixed to the upper beam structure 19 and two such bracket members 47 are fixed to the bottom horizontal beam structure of carriage member 17. The support member 18 extends from the base of carriage member 17 and is generally elongated and constructed of a plurality of rigid metal beams 19. The support member 18 supports the remaining elements of the device 10 and permits their alignment to an operative position.

The positioning sleeve 12 is a rigid, hollow metal beam member having a generally rectangular cross-section. It is open at both ends. The sleeve 12 is connected to the support member 18 by a swivel shaft 20. The swivel shaft 20 is connected at each end to the support member 18 so that it is aligned perpendicular to the direction of extension of the support member 18 from the carriage 17. The sleeve 12 is movably connected to the swivel shaft 20 at a point 21 intermediate its length so that it pivots about shaft 20. The sleeve 12 is thus aligned parallel to the direction of extention of the support member 18 from the carriage 17. The sleeve 12 is rotatable through an angle range of 1 to 50 degrees relative to the horizontal plane of the support member 18.

The positioning sleeve 12 is for alignment of the drive shaft assembly 14 and agitator assembly 16 with the access port for insertion thereinto. Alignment is accomplished by rotation of the sleeve 12 about the swivel shaft 20 until the sleeve 12 is in the plane of the access port. Rotation of the sleeve 12 is accomplished by the first linear forces means 13, such as a hydraulic cylinder which is pivotally connected at one end to the support member 18 and at the other end to the positioning sleeve 12 at a position near the sleeve 12 end nearest to the carriage 12. The first linear force means is adjustable so that as force is applied in either direction the positioning sleeve 12 is rotated. An outward or extending force increases the angle of incline between the sleeve 12 and the support member 18. An inward or retracting force decreases the angle. Means 13 may also be a mechanical system. The first linear force means 13 also functions to secure the positioning sleeve 12 in its adjusted position.

The drive shaft assembly 14 extends through the interior of the positioning sleeve 12 and outwardly from both open ends thereof and it is linearly moveable through the interior of the sleeve 12. The drive shaft assembly 14 has a housing structure 24, a shaft member 25, bearings 30, a flange bearing 26, a spacer flange 27 and a seal ring 28. The shaft member 25 is a rigid, elongated rod axially disposed in the interior of the housing structure 24. It protrudes slightly therefrom at both ends approximately 3 inches. Bearings 30 are circumferentially located about the shaft member 25 at each end thereof. Seal flanges 26, 27, 28 are circumferentially disposed about the bearings 30.

The positioning sleeve 12 is shown to have an apertured member 49 attached at one end. The drive shaft assembly 14 is shown to have an apertured member 48 attached at its end. By means of a locking pin 50, The apertured member 48 and 49 are thereby utilized to fix the drive shaft assembly 14 to the positioning sleeve 12.

The access port centering or guide means 29 are metal slat members or protusions which project outwardly from each face of the housing structure 24. They improve insertion and removal of the agitator assembly 16 through the access port. For example, upon removal of the agitator assembly 16 through the access port 43, the drive shaft guide members 29 prevent the seal and flange members 27 and 28 and the collapsing propellor blades 32 from getting caught or hooked on the access port edges. Additionally, as is shown in FIG. 4, the top V-shaped guide member 29 can be used for fastening cable 39 to the drive shaft assembly 14.

The drive shaft assembly 14 is for insertion at one end into the waste structure 42 via the access port 43. The insertable end has the collapsible agitator assembly 16 attached to it. Subsequent to insertion, the drive shaft assembly 14 is connected to the power take-off at its opposite, non-insertable end. The drive shaft assembly 14 translates rotational force from the power take-off to the insertable end, thereby spinning or rotating the attached agitator assembly 16 so that its individual blades expand outwardly to stir and homogenize the waste structure contents.

Figure 5:
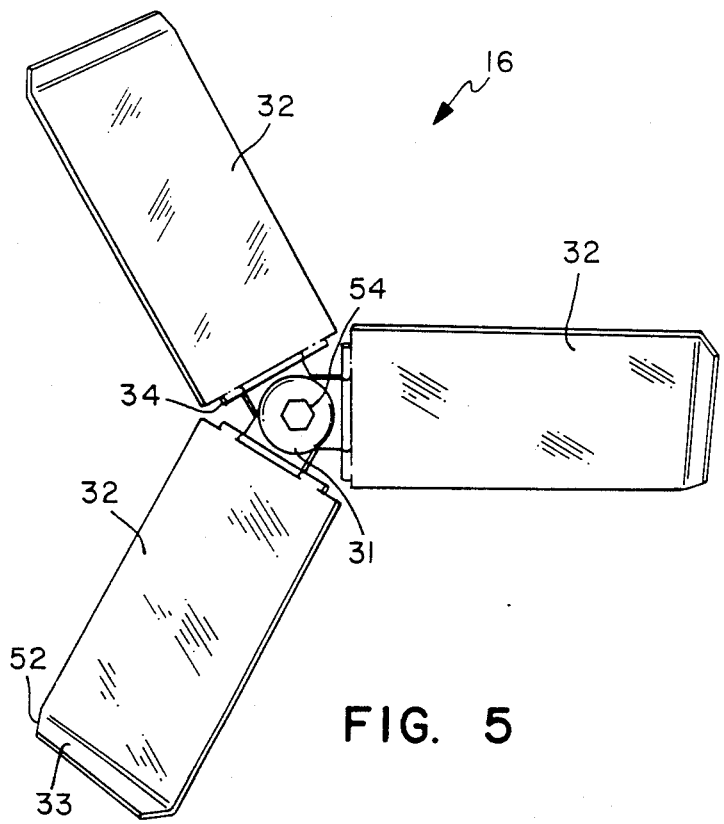
FIG. 5 is a perspective view of the agitator assembly of the invention.
Figure 6:
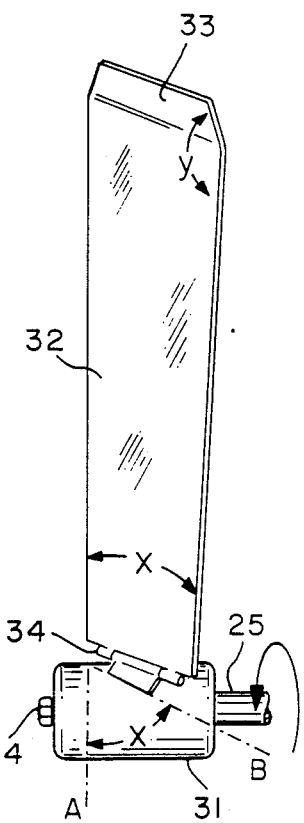
FIG. 6 is a side plan view of the agitator assembly shown in FIG. 5.

FIGS. 5 and 6 show the agitator assembly 16 having a shaft member attachment hub 31 and three propellor blades 32 pivotally attached thereto at their terminal ends by means of hinges 34. The shaft member attachment hub 31 is attached to the shaft member 25 at the insertable end of the drive shaft assembly 14 by means of a bolt 54, which also has a shear pin. The bolt 54 is threaded into the end of the drive shaft member in a direction opposite the rotational direction of the shaft member. The propellor blades 32 are collapsible and extend forward and away from the rest of the device 10 for easy insertion into the access port. The collapsed radial diameter of the agitator 16 is such that it slides into access port 43. FIG. 5 additionally shows a slanted or rounded corner portion 52 on the leading edge of the blade tip end 33.

Figure 7:
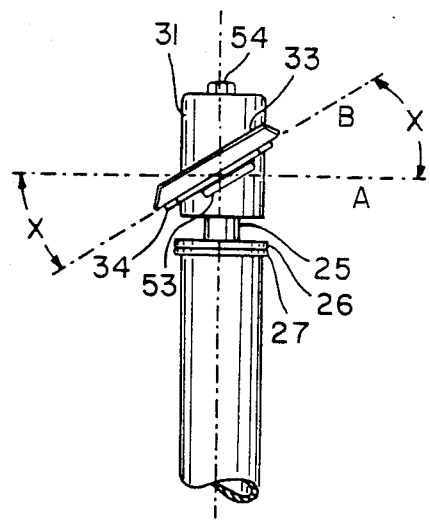
FIG. 7 is a top view of the agitator assembly shown in FIGS. 5 and 6.

FIG. 6 illustrates a single blade 32 having a configuration whereby the blade tip end 33 is shown to have an angle Y (140 to 170 degrees from the blade body) and the blade body itself is shown to be tipped at an angle X (20 to 45 degrees) with respect to the vertical plane of hub 31. As further shown in FIG. 7, the vertical plane through the hub 31 is shown as "A" and the blade body plane as "B". Additionally, a stop member 53 is shown mounted to the bottom rear portion of blade 32 which engages hub 31 and fixes the blade in a vertical direction with respect to hub 31 during operation. It has been found that a three-bladed agitator assembly having individual blade configurations of an angle Y of approximately 159 degrees and an angle X of approximately 32 degrees to suited for a power take-off unit of a tractor having approximately 35 to 70 horsepower. Such a three bladed agitator assembly can move up to 70,000 gallons of slurry per minute which is required for adequate agitation.

Propellor blades 32 are rigid and have a specific body configuration. The blades 32 have proximal ends or tips 33 which are an integral portion of the blade 32 structure. The tip ends 33 bend forwardly in the direction of insertion to form an obtuse angle in a range of 140 to 170 degrees with respect to the blade body. The propellor blades 32 are rigid and composed of metal, but may also be composed of plastic or a similarly rigid, durable substance.

The agitator assembly 16 mixes solid and liquid components to a slurry state. In use, it rotates in a clockwise direction, from a point of reference at the carriage 17, upon engagement of the power source. Rotation causes the collapsed blades 32 to expand radially and outwardly by pivoting about the hinges 34. Tip ends 33 also function to homogenize solid and liquid waste by causing a more directional flow. Various size blades 32 (length and width) may be used to provide larger agitators 16 (expanded) for use in different waste structures.

Referring to FIG. 4, the second linear force means 15 is comprised of a base 35, a ratcheting spool 36, a hand crank 37, a roller 38 and a cable 39. These elements in combination comprise a general hand operable winch system for inserting and removing the drive shaft assembly 14 and the attached agitator assembly 16 into and from the waste structure. The second linear force means 15 may also be a hydraulic or electric motor system.

The base 35 is a hollow, rigid metal beam similar in structure to beam 19 of frame 11, having a generally rectangular cross-section. The proximal end of the base 35 is attached to the top of the positioning sleeve 12 at a point intermediate its length. The base 35 extends upright and slants back towards the carriage 17. The angle of slant between the base 35 and the sleeve 12 is aproximately 50 degrees. This angle is conducive to directional changes in force required during operation of the second linear force means 15. The base 35 is for support of the remaining elements of the second linear force means 35 in a position conducive for operator manipulation.

The ratcheting spool 36 is disposed near the terminal end of the base 35 and faces towards the insertable end. The ratcheting spool 36 is operated by the hand crank 37 which is attached thereto. The ratcheting spool 36 holds the cable 39 and cooperates therewith to provide a means of retracting, extending and securing in a retracted or extended position, the drive shaft assembly 14.

Cable 39 is connected at one end to the ratcheting spool 36 and its other end to the access port centering or guide means 29. The cable 39 is a 3/16 inch galvanized metal wire cable of sufficient length to allow full extention of the drive shaft assembly 14 for insertion into the waste structure. The cable 39 is disposed through a roller 38. The roller 38 is disposed on the positioning sleeve 12 near the proximal end of the base 35. It cooperates with cable 39 to change the direction of the force exerted by the ratcheting spool 36 to coincide with the horizontal plane of the drive shaft assembly 14.

As many changes are possible to the embodiments of the manure pit manure pit stirrer utilizing the teachings of the invention, the descriptions above and the accompanying drawings should be interpreted in the illustrative and not in the limited sense.

That which is claimed is:

1. A portable, adjustable and collapsible stirring device for agitating and homogenizing to a slurry state the solid and liquid components of waste materials contained in an enclosure having an angularly positioned ingress/egress port of a tubular structure and having a predetermined diameter, said device being connectible to a power source comprising:

(a) a rigid frame structure, said rigid frame structure having a substantially horizontal support structure with a frontal end, said frame structure being connectible to conveyance means, said frame structure having a rotatable shaft mounted at said frontal end;
(b) an adjustable, hollow positioning sleeve having first and second open ends, said sleeve being mounted at said first end to said rotatable shaft and being constructed and arranged so that said positioning sleeve is pivotable through an angle range of approximately 50 degrees with respect to said horizontal support structure to thereby align said positioning sleeve with the ingress/egress port, said positioning sleeve further having a base portion mounted thereon;
(c) an adjustable linear force means pivotally mounted to said horizontal support structure and being pivotally and directly connected to said positioning sleeve adjacent said second open end thereof for rotating said sleeve through said predetermined angle range to align said positioning sleeve with the ingress/egress port;
(d) an elongated, sealed drive shaft assembly having a central axis and being smaller in diameter than that of the ingress/egress port movably disposed in said positioning sleeve, said shaft assembly having a hollow housing structure and an axial shaft member mounted for rotation therein, said drive shaft assembly further having a first end extending outwardly from said first open end of said positioning sleeve for insertion into the ingress/egress port of the enclosure and a second end extending outwardly from said second open end of said positioning sleeve for connection to the power source, said drive shaft assembly being pivotable with said rotatable shaft whereby said central axis is closely spaced to said frontal end of said frame structure;
(e) an adjustable winch assembly connected to said base portion of said positioning sleeve and further being connected to said drive shaft assembly by a cable, said cable being attached generally at said first end of said drive shaft assembly and movably coupled with and aligned on the exterior of said positioning sleeve at a predetermined angle for inserting and removing said drive shaft assembly into and from the enclosure ingress/egress port; and
(f) a collapsible agitator assembly having a diameter in its collapsed state smaller than the predetermined diameter of the ingress/egress port and being connected to said first end of said drive shaft assembly, said collapsible agitator assembly having a plurality of propellor blades and a central hub for affixing said agitator assembly to said axial shaft member, said blades being pivotally attached to said hub and being constructed and arranged to expand by centrifugal force to an operative diameter greater than that of the ingress/egress port upon the rotation of said agitator assembly by said drive shaft assembly, whereby said stirring device is usable through the tubular port by only the insertion of said drive shaft assembly and said collapsible agitator assembly therethrough.

2. The device of claim 1, wherein said rigid frame structure has means to attach said frame to a tractor having a power take-off means.

3. The device of claim 1, wherein said frame structure has a trailer axle and wheel assembly.

4. The device of claim 1, wherein said rigid frame structure further has a carriage member disposed substantially vertically therefrom, said vertical carriage member being a 3 point carriage assembly connectible to a 3 point hitch of a tractor.

5. The device of claim 1, wherein said member shaft assembly has locking means to lock said drive shaft in said positioning sleeve.

6. The device of claim 1, wherein said propellor blades additionally have hinges for the pivotal attachment to said hub and further having a predetermined body shape with angled tip ends, said angle between said tips and said blade body being obtuse and ranging from 140 to 170 degrees.

7. The device of claim 1, wherein said agitator assembly has three blades hingedly attached thereto.

8. The device of claim 1, wherein stop members are fixed to predetermined locations on said agitator assembly blades to engage said hub.

9. The device of claim 1, wherein said propellor blades have planar body portions and are angled outwardly with respect to a vertical cross-sectional plane through said hub and wherein said planar body portions of said blades are angled outwardly in a range of 20 to 45 degrees therefrom.

10. An adjustable stirring device for agitating into a slurry state the solid and liquid components of a waste material in an enclosure having an ingress/egress port of a tubular structure and having a predetermined diameter and being connectable to a power source comprising:
(a) an adjustable frame structure having a frontal end and being constructed and arranged to align the device in an operative position, said frame structure having a rotatable shaft mounted at said frontal end;
(b) an angularly adjustable linear and hollow positioning sleeve of a predetermined length having first and second open ends, said positioning sleeve being mounted at said first open end to said rotatable shaft and being pivotable from the horizontal to about 50 degrees with respect to said frame structure to thereby align said positioning sleeve with the ingress/egress port;
(c) an adjustable first linear force means pivotally and directly connected at one end to said frame structure and pivotally and directly connected at its opposite end adjacent said second open end of said positioning sleeve and being constructed and arranged for rotationally aligning said positioning sleeve with the ingress/egress port;
(d) a drive shaft assembly having a central axis and a diameter less than the ingress/egress port and having two ends for extending through and outwardly from said positioning sleeve ends and being movable therethrough, said one end being pivotable with said positioning sleeve with respect to the frontal end of said frame structure and being for insertion into the waste structure and said other end for connection to the power source and being for translation of a rotational force from the power source to the insertable end of said drive shaft assembly, said drive shaft assembly further having means to lock said drive shaft assembly in a fixed position in said positioning sleeve;
(e) an adjustable winch assembly fixed to said positioning sleeve and connected to said drive shaft assembly and being constructed and arranged for inserting and removing said drive shaft assembly through said positioning sleeve into and from the enclosure; and (f) a collapsible, directional flow agitator assembly for homogenizing waste material having a diameter in its collapsed state smaller than the predetermined diameter of the ingress/egress port and being connected to the insertable end of said drive shaft assembly, said agitator assembly having a hub and a plurality of propellor blade bodies that are hinged thereto so that said blades collapse into a structural configuration having a cross-sectional structure for insertion into the enclosure port and which expand by centrifugal force to an operative diameter greater than that of the ingress/egress port upon the activation of the power source, said blades further having tip ends bent forwardly and away from said drive shaft assembly, said tip ends being obtusely angled between 140 to 170 degrees with respect to said blade bodies, whereby said stirring device is usable through the tubular port by only the insertion of said drive shaft assembly and said collapsible agitator assembly therethrough.

11. The stirring device of claim 10, wherein said agitator assembly has three blades and wherein said assembly has a triangular configuration when in a collapsed position.

12. The stirring device of claim 10, wherein said frame structure has means for attachment to the 3 point hitch of a tractor having power take-off means.

13. An adjustable stirring device for agitating non-homogeneous waste materials in structures having angularly disposed ingress/egress ports of a tubular structure and a predetermined diameter comprising:

(a) a collapsible agitator assembly having a collapsed diameter greater than that of the ingress/egress port when in an operative state and having a hub and three blade bodies hingedly attached thereto and being constructed and arranged so that said blade bodies collapse with respect to said hub to form a triangular cross/sectional configuration for insertion into and removal from the ingress/egress port, said blade bodies further having a planar rectangular configuration and being angled outwardly with respect to a vertical cross-sectional plane through said hub and said planar blade bodies being angled in a range of 20 to 45 degrees. therefrom when in their operative state, said agitator assembly having an exhaust direction and further having tip ends that are bent toward the direction of said agitator assembly exhaust at an obtuse angle with respect to the blade bodies in a range of 140 to 170 degrees;

(b) a drive member assembly connected to said agitator assembly, said drive member assembly further having a central axis, said vertical cross-sectional plane through said hub being perpendicular to said central axis;

(c) a power source connectable to said drive member assembly;

(d) a frame structure having a frontal end and a rotatable shaft mounted at said frontal end for supporting said drive member assembly and being for aligning said agitator assembly in an operative position; and (e) alignment means mounted to said frame structure being constructed and arranged to tilt said drive member assembly about said rotatable shaft with respect to the frontal end of said frame and to slide said drive member assembly into and from the waste structure ports, said alignment means further being comprised of a sleeve member directly and pivotally connected to said rotatable shaft and a first and second linear force means, said first force means comprising a hydraulic cylinder being directly and pivotally connected to said frame structure and to said sleeve member to pivot said sleeve member with respect to said frontal end of said frame structure, said second force means being connected to and operative on said sleeve member to position said drive member assembly in and through the tubular port structure, whereby said stirring device is usable through the tubular port by only the insertion of said drive member assembly and said collapsible agitator assembly therethrough.

14. The device of claim 1, wherein said adjustable linear force means is a hydraulic cylinder.

15. The device of claim 6, wherein each said blade tip has a slanted corner portion to aid in the stirring and homogenizing of waste materials.

16. The device of claim 10, wherein said first linear force means is comprised of a hydraulic cylinder.

17. The device of claim 10, wherein said propellor blade bodies have planar body portions and are angled outwardly with respect to a vertical cross-sectional plane through said hub in a range of 20-45 degrees when in their expanded state.

18. The device of claim 10, wherein said propellor blade tip ends have slanted corner portions to aid in the stirring and homogenizing of waste materials and wherein said propellor blade bodies have stop menbers fixed to the bottom rear portions thereof to engage said hub when in their expanded state.

19. The device of claim 13, wherein said blade bodies have stop members fixed to the bottom rear portions thereof to engage said hub when in their operative state.

20. The device of claim 13, further comprising means to lock said drive member assembly with said sleeve member.

* * * * *